(12) United States Patent
Creamer et al.

(10) Patent No.: US 7,399,810 B2
(45) Date of Patent: Jul. 15, 2008

(54) POLYMERIZATION OF MONOMERS WITH DIFFERING REACTIVITIES

(75) Inventors: Marianne Creamer, Warrington, PA (US); Joseph Manna, Quakertown, PA (US)

(73) Assignee: Rohm and Haas Company, Philadelphia, PA (US)

(*) Notice: Subject to any disclaimer, the term of this patent is extended or adjusted under 35 U.S.C. 154(b) by 0 days.

(21) Appl. No.: 11/368,185

(22) Filed: Mar. 3, 2006

(65) Prior Publication Data

US 2007/0244282 A1    Oct. 18, 2007

Related U.S. Application Data

(60) Provisional application No. 60/658,784, filed on Mar. 4, 2005.

(51) Int. Cl.
*C08F 2/38* (2006.01)
*C08F 20/06* (2006.01)
*C08F 20/56* (2006.01)

(52) U.S. Cl. .............................. 526/87; 526/79; 526/84; 526/85; 526/307.3; 526/310; 526/317.1

(58) Field of Classification Search .................. 526/79, 526/84, 85, 87, 307.3, 310, 317
See application file for complete search history.

(56) References Cited

U.S. PATENT DOCUMENTS

| 5,110,883 | A | 5/1992 | Gartner |
| 5,171,783 | A | 12/1992 | Gartner |
| 5,750,781 | A | 5/1998 | Yoshida et al. |

FOREIGN PATENT DOCUMENTS

| EP | 0 363 024 | 4/1990 |
| EP | 1698688 | 9/2006 |

OTHER PUBLICATIONS

H.A.S. Schoonbrood, et al. "Emulsion Co- and Terpolymerization of Styrene, . . . " Journal of Polymer Science: Pt. A: Polymer Chemistry, vol. 34. pp. 949-955, 1996.
F. Brand, et al., "Polymelectrolytes with Various Charge Densities: Synthesis and Charterization . . . ," Die Angewandte Makromolekulare Chmie vol. 248, No. 4286, pp. 41-71, 1997.

*Primary Examiner*—Helen L. Pezzuto
(74) *Attorney, Agent, or Firm*—Carl P. Hemenway

(57) ABSTRACT

There is provided a process for producing a polymer comprising the steps of
(a) adding at least one low-reactivity monomer to a reaction vessel with a decreasing rate of addition,
(b) adding at least one high-reactivity monomer to said reaction vessel,
  (i) wherein less than 1% of all of said high-reactivity monomers, by weight of high reactivity monomers, based on the weight of all said high-reactivity monomers, is added to said reaction vessel before the beginning of said step (a), and
  (ii) wherein at least half of all of said high-reactivity-monomers, by weight of high reactivity monomers, based on the weight of all of said high-reactivity monomers, is added to said reaction vessel before the completion of said step (a), and
(c) adding at least one chain regulator to said reaction vessel prior to the completion of said step (a),
wherein said steps (a), (b), and (c) are performed while conditions in said reaction vessel will cause polymerization of said low-reactivity monomer and said high-reactivity monomer.

9 Claims, No Drawings

POLYMERIZATION OF MONOMERS WITH DIFFERING REACTIVITIES

This Application claims the benefit of U.S. Provisional Application 60/658,784, filed on Mar. 4, 2005.

BACKGROUND

It is often desired to form copolymers from monomers that have reactivities that differ from each other. Processes that attempt to make such copolymers sometimes result in one or more of the following outcomes: nonuniform polymer composition, nonuniform polymer molecular weight, high level of residual monomer, or any combination thereof. For example, U.S. Pat. No. 5,110,883 presents one method of addressing these problems, using a solution polymerization method in which all of the desired diallyl ammonium monomer and a portion of the desired acrylamide monomer are mixed together and initiated; in which the remaining acrylamide monomer is added by continuous stage addition; and in which chain transfer agent is added after the completion of polymerization.

It is desired to provide a copolymerization process for monomers with reactivities that differ from each other. It is desired to provide such a process that does not require placing all of the desired low-reactivity monomer into the reaction vessel prior to beginning the copolymerization process. It is also desired to provide such a process that results in one or more of the following additional benefits: uniform polymer composition, uniform molecular weight, or low levels of residual monomer.

STATEMENT OF THE INVENTION

In the present invention, there is provided a process for producing a polymer comprising the steps of
  (a) adding at least one low-reactivity monomer to a reaction vessel with a decreasing rate of addition,
  (b) adding at least one high-reactivity monomer to said reaction vessel,
    (i) wherein less than 1% of all of said high-reactivity monomers, by weight of high reactivity monomers, based on the weight of all said high-reactivity monomers, is added to said reaction vessel before the beginning of said step (a), and
    (ii) wherein at least half of all of said high-reactivity monomers, by weight of high reactivity monomers, based on the weight of all of said high-reactivity monomers, is added to said reaction vessel before the completion of said step (a), and
  (c) adding at least one chain regulator to said reaction vessel prior to the completion of said step (a),
wherein said steps (a), (b), and (c) are performed while conditions in said reaction vessel will cause polymerization of said low-reactivity monomer and said high-reactivity monomer.

DETAILED DESCRIPTION

A "polymer," as used herein and as defined by F W Billmeyer, JR. in *Textbook of Polymer Science*, second edition, 1971, is a relatively large molecule made up of the reaction products of smaller chemical repeat units. Normally, polymers have 11 or more repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. Chemicals that react with each other to form the repeat units of a polymer are known herein as "monomers," and a polymer is said herein to be made of "polymerized units" of the monomers that reacted to form the repeat units. The chemical reaction or reactions in which monomers react to become polymerized units of a polymer, whether a homopolymer or any type of copolymer, are known herein as "polymerizing" or "polymerization."

As used herein, the prefix "(meth)acryl-" means "methacryl- or acryl-."

Polymer molecular weights can be measured by standard methods such as, for example, size exclusion chromatography (also called gel permeation chromatography) or intrinsic viscosity. Generally, polymers have weight-average molecular weight (Mw) of 1,000 or more.

As used herein, the phrase "the ratio of a first quantity to a second quantity" means a single number that results from dividing the first quantity by the second quantity.

In the practice of the present invention, at least two monomers are used, and these two monomers have different reactivities from each other; that is, they have reactivities that create, under polymerization conditions, a tendency for homopolymers of each monomer to form and a tendency for few, if any, statistical copolymers of the two monomers to form. It is, in general, difficult to make a copolymer from such a pair of monomers. Such a situation normally arises when one monomer in the pair (the "high-reactivity monomer"), when it is at the active end of growing polymer chain, tends to add another monomer like itself, rather than the other monomer (the "low reactivity monomer"), to the growing polymer chain. Such pairs of monomers are suitable for use in the present invention.

This reactivity condition can be described, for example, using reactivity ratios, as defined, for example, by George Odian, in *Principles of Polymerization,* 3rd edn, John Wiley & Sons, 1991. Each monomer in the pair has a reactivity ratio "r" that is defined as the ratio of two rate constants involving a propagating polymer chain ending in that monomer. The ratio "r" is the ratio of the rate constant for that propagating polymer chain to add the same type monomer to the rate constant for that propagating polymer chain to add the other type monomer. It is well known that a pair of monomers can be chosen such that their r values are far different from each other, and mixture of the two monomers under polymerization conditions will produce little or no copolymer with a statistical distribution of the two monomers in the proportion of the monomer mixture.

In some embodiments of the present invention, a pair of monomers with reactivity different from each other is used, optionally along with one or more additional monomer, in which the monomer with the higher r value is labeled herein the "high-reactivity monomer" and the r value for that monomer is labeled herein "rH." The other monomer in the pair is labeled herein the "low-reactivity monomer," and the r value of the low-reactivity monomer is labeled herein "rL." In some of such embodiments, the ratio of rH to rL is 5 or greater; or 10 or greater.

It is also contemplated that the method of the present invention may be used with any group of monomers, which may include two monomers or three monomers or more than three monomers, as long as the group includes at least one pair of monomers that have different reactivities from each other.

In some embodiments that involve three or more monomers, one monomer can be identified as a low-reactivity monomer, another monomer can be identified as a high-reactivity monomer, and at least one of the remaining monomers has reactivity that is comparable in reactivity to the low-reactivity monomer or to the high-reactivity monomer. As used herein, two monomers have "comparable reactivity" if they have the characteristic that, were they mixed together under normal polymerization conditions, the principal product would be a statistical copolymer. Using the quantitative criteria defined above, two monomers have comparable reactivity if the r values for that pair of monomers is examined, and the ratio of the higher of the two r values to the lower of the two r values is 4 or lower. For example, in some embodiments, three monomers are used: one has low-reactivity, one has high-reactivity, and the third has reactivity comparable to the high-reactivity monomer.

In some embodiments, at least one low-reactivity monomer is a diallyldialkylammonium quaternary compound, which is a compound with the structure

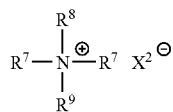

where each $R^7$ is an allyl group; each of $R^8$ and $R^9$ is, independently, an alkyl group with 1 to 3 carbon atoms; and $X^{2\ominus}$ is an anion. Some suitable anions are, for example, halides (including, for example, chloride, bromide, or iodide), hydroxide, phosphate, sulfate, hydrosulfate, ethyl sulfate, methyl sulfate, formate, acetate, or any mixture thereof. In some embodiments, each of $R^8$ and $R^9$ is a methyl group. Independently, in some embodiments, $X^{2\ominus}$ is a chloride ion.

Under many common polymerization conditions, a diallyldialkylammonium quaternary monomer forms a polymerized unit that is a 5-membered ring.

In some embodiments, at least one high-reactivity monomer is used that is an anionic monomer. Anionic monomers are compounds that form polymerized units in which at least one anion is covalently attached to the polymer backbone. The cation or cations corresponding to the covalently-attached anion or anions may be in solution, in a complex with the anion, located elsewhere on the polymer, or a combination thereof. In some embodiments, one or more anionic monomers are used that contain an anion that exists in anionic form when residing in water at some range of pH values, while that anion may be in neutral form at some other pH values. In some embodiments, at least one anionic monomer is used that is in neutral form during polymerization; in such embodiments, after polymerization, conditions surrounding the polymer (such as, for example, pH) are altered so that the polymerized unit resulting from that anionic monomer acquires a negative charge.

Some suitable anionic monomers are, for example, ethylenically unsaturated acid monomers, including, for example, ethylenically unsaturated carboxylic acid monomers, maleic monomers, and ethylenically unsaturated sulfonic acid monomers. Suitable unsaturated carboxylic acid monomers include, for example, acrylic acid, methacrylic acid, and mixtures thereof. Suitable maleic monomers include, for example, maleic acid, maleic anhydride, and substituted versions thereof. Suitable unsaturated sulfonic acid monomers include, for example, 2-(meth)acrylamido-2-methylpropanesulfonic acid, 4-styrenesulfonic acid, vinylsulfonic acid, 2-sulfoethyl(meth)acrylic acid, 2-sulfopropyl(meth) acrylic acid, 3-sulfopropyl(meth)acrylic acid, and 4-sulfobutyl (meth) acrylic acid.

Independent of any anionic monomer that may or may not be used, in some embodiments at least one high-reactivity monomer is used that is a nonionic monomer. A nonionic monomer is a monomer that forms a polymerized unit of a polymer, where that polymerized unit has no group that forms an ion to any significant extent in water at any pH from 2 to 8. Some suitable nonionic monomers are, for example, ethylenically unsaturated nonionic compounds, including compounds with one double bond, two double bonds, or more than two double bonds. Suitable ethylenically unsaturated nonionic monomers include, for example, olefins, substituted olefins (including, for example, vinyl halides and vinyl carboxylates), dienes, (meth)acrylates, substituted (meth)acrylates, (meth)acrylamide, substituted (meth)acrylamides, styrene, substituted styrenes, and mixtures thereof. As used herein "(meth)acrylates" are esters of acrylic acid or methacrylic acid; and "substituted" means any substituent group, including, for example, halogens, hydroxyl groups, alkyl groups, vinyl groups, (meth)acrylic groups, glycidyl groups, hydroxyalkyl groups, alkylene oxide groups, polyalkylene oxide groups, and combinations thereof. In some embodiments, one or more nonionic monomer is used that is selected from the group of (meth)acrylate esters, substituted (meth) acrylate esters, (meth)acrylamide, substituted (meth)acrylamide, and mixtures thereof. In some embodiments, acrylamide or methacrylamide or a mixture thereof is used.

In some embodiments, one or more crosslinking monomer is used. In other embodiments, no crosslinking monomer is used. A crosslinking monomer is a monomer that has two functional groups capable of participating in a polymerization reaction. Some crosslinking monomers, for example, have two or more ethylenically unsaturated groups. Some crosslinking monomers, for example, have at least one ethylenically unsaturated group and at least one other group (such as, for example, a glycidyl group) capable of participating in a polymerization reaction.

In some embodiments, one or more alkyl ester of (meth) acrylic acid is used. In other embodiments, no alkyl ester of (meth)acrylic acid is used. In some of the embodiments in which one or more alkyl ester of (meth)acrylic acid is used, at least one such ester is used in which the alkyl group has 4 or more carbon atoms.

In some embodiments, one or more ester of (meth)acrylic acid is used, where the ester group contains at least one alkylene oxide group. Such ester groups may contain one or more single alkylene oxide groups, one or more polyoxyethylene groups, or a combination thereof. In some embodiments, no ester of (meth)acrylic acid where the ester group contains at least one alkylene oxide group is used.

In some embodiments, the amount of low-reactivity monomer is such that the polymerized units of low-reactivity monomer in the copolymer is 20% to 90% by weight of all low-reactivity monomer, based on the solid weight of the copolymer.

In some embodiments, the amount of high-reactivity monomer is such that the polymerized units of high-reactivity monomer in the copolymer is 10% to 70% by weight, based on the solid weight of the copolymer.

In some embodiments, all monomers are capable of free-radical polymerization.

Among embodiments in which at least one diallyldialkylammonium quaternary compound is used and in which at least one anionic monomer is also used, one useful way of characterizing the copolymer that is made by the method of the present invention is the equivalent ratio of polymerized units of diallyldialkylammonium quaternary compound to polymerized units of all anionic monomers. The equivalent value of a polymerized unit from an anionic monomer is the number of anions that are covalently bound to the polymer molecule in that polymerized unit.

In some embodiments, the equivalent ratio of polymerized units from all diallyldialkylammonium quaternary compounds to polymerized units from all anionic monomers is 0.33 or higher. In some embodiments, that equivalent ratio is 0.5 or higher; or 0.75 or higher; or 0.9 or higher; or 0.95 or higher.

Independently, in some embodiments, the equivalent ratio of polymerized units from diallyldialkylammonium quaternary compounds to polymerized units from all anionic monomers is 1.2 or lower. In some embodiments, that equivalent ratio is 1.1 or lower; or 1.05 or lower.

In some embodiments, the copolymer made by methods of the present invention has weight-average molecular weight of 50,000 or less. In some embodiments, the copolymer made by methods of the present invention has weight-average molecular weight of 40,000 or less; or 30,000 or less; or 20,000 or less.

Independently, in some embodiments, the copolymer made by methods of the present invention has weight-average molecular weight of 1,000 or more. In some embodiments, the copolymer made by methods of the present invention has weight-average molecular weight of 2,000 or more; or 3,000 or more; or 4,000 or more.

The present invention may be practiced using any polymerization method, including, for example, solution polymerization, bulk polymerization, heterogeneous phase polymerization (including, for example, emulsion polymerization, suspension polymerization, dispersion polymerization, and reverse-emulsion polymerization), and combinations thereof. Independently, any type of polymerization reaction, including, for example, free radical polymerization, may be used. When solution polymerization is used, the solvent may be an aqueous solvent (i.e., the solvent is 75% or more water, by weight, based on the weight of the solvent) or an organic solvent (i.e., a solvent that is not aqueous). Some suitable solvents contain, for example, a mixture of water and up to 60% by weight, based on the mixture, of one or more OH-containing solvent which is selected from among C1-C4-alkanols, C2-C10-alkylene glycols, in which the alkylene chain may be interrupted by one or more non-adjacent oxygen atoms and monoethers of the C2-C10-alkylene glycols with C1-C4-alkanols. Examples of suitable OH-containing solvents are methanol, ethanol, isopropanol, n-butanol, ethylene glycol, diethylene glycol, methyl diglycol, dipropylene glycol, butyl glycol, butyl diglycol, triethylene glycol, the methylethers of said glycols and also oligomers of ethylene oxide containing from 4 to 6 ethylene oxide units, oligomers of propylene oxide containing from 3 to 6 propylene oxide units and also polyethylene glycol-polypropylene glycol cooligomers. Independently, a solvent that contains water may optionally further contain one or more other water-miscible solvents such as, for example, acetone, methyl ethyl ketone, tetrahydrofuran, dioxane, N-methylpyrrolidone, dimethylformamide, etc.

In some embodiments, at least one copolymer is made by free radical polymerization in solution. In some of such embodiments, at least one copolymer is made by free radical solution polymerization in an aqueous solvent.

In the practice of the present invention, polymerization takes place in a reaction vessel. It is contemplated that some or all monomer is added to the reaction vessel while polymerization is occurring. For example, initiator may be added to the reaction vessel prior to monomer, and the conditions of reaction vessel (e.g., temperature, radiation, presence of reactive species, etc.) may be adjusted so that the initiator generates one or more free radicals prior to addition of monomer. For another example, initiator may be added simultaneously with all of or with a portion of one or more monomer. It is also contemplated that initiator may be added both before monomer and also simultaneously with one or more monomer.

One aspect of the present invention is the rate of addition, which is the rate at which each ingredient is added to the reaction vessel. In some embodiments, all of an ingredient or a portion of that ingredient is added to the reaction vessel using one or more steps, where a step is a period of time during which that ingredient is added to the reaction vessel at a constant rate (i.e., with a constant value of mass of ingredient per unit of time). Whatever rate of addition is used, it is contemplated that any ingredient may be added suddenly, or continuously with or without any pause (i.e., period of time during which none of that ingredient is added to the reaction vessel, followed by a resumption of addition of that ingredient to the reaction vessel).

In the practice of the present invention, at least one low-reactivity monomer is added to the reaction vessel with a decreasing rate of addition. By "decreasing rate of addition" is meant herein that the rate of addition does not increase during the polymerization reaction and that the final rate of addition is lower than the initial rate of addition. For example, in some embodiments, the rate of addition of a low-reactivity monomer could be continuously decreased until all of that monomer was added to the reaction vessel. For another example, a low-reactivity monomer could be added using two or more steps, where each step after the first step had a rate of addition lower than the preceding step. Also contemplated are addition methods in which a low-reactivity monomer is added using steps and also periods of time in which the rate of addition continuously decreases. Independent of the rate of addition, the addition of low-reactivity monomer to the reaction kettle may be performed continuously without any pause, or there may be one or more pause.

In some embodiments, at least one low-reactivity monomer is added to the reaction vessel in such a way that the entire amount of that low-reactivity monomer is added using a sequence of two or more steps, where each step has a lower rate of addition than the preceding step. In some of such embodiments, the ratio of the rate of addition during the second step to the rate of addition during the first step is 0.01 or higher; or 0.05 or higher; or 0.1 or higher. Independently, in some of such embodiments, the ratio of the rate of addition during the second step to the rate of addition during the first step is 0.8 or lower; or 0.7 or lower; or 0.5 or lower; or 0.2 or lower. Independent of the values of the feed rate, in some of such embodiments, the ratio of the duration of the second step to the duration of the first step is 0.5 or higher; or 0.9 or higher; or 1.25 or higher; or 1.75 or higher; or 1.9 or higher. Independently, in some of such embodiments, the ratio of the duration of the second step to the duration of the first step is 10 or lower; or 5 or lower; or 4 or lower; or 3 or lower.

In some of the embodiments that use three or more steps for the addition of low-reactivity monomer, it is contemplated that the rate of addition and the duration of any step after the second to the preceding step could have the same relation to the preceding step as the relation described above for the relation of the second step to the first step. If three or more steps are used for the addition of low-reactivity monomer, it is contemplated that the rate of addition and the duration each step could be chosen independently of the other steps, as long as a decreasing rate of addition is used.

It is contemplated that little or no high-reactivity monomer is added to the reaction vessel prior to the addition of low-reactivity monomer to the reaction vessel. The amount of high-reactivity monomer that is added to the reaction vessel prior to the addition of any low-reactivity monomer to the reaction vessel is, by weight of high-reactivity monomers, based on the weight of all high-reactivity monomers, 1% or less; or 0.1% or less; or none.

The high-reactivity monomer may be added to the reaction vessel at any addition rate. In some embodiments, at least one high-reactivity monomer is added entirely at a constant rate of addition. Independently, in some embodiments, at least one high-reactivity monomer is added at an increasing rate of addition. An increasing rate of addition may be accomplished, for example, by continuously increasing the rate of addition or by performing a series of two or more steps, in which each step after the first step had a constant rate of addition that is higher than the rate of addition in the preceding step. Independent of the rate of addition, the addition of high-reactivity monomer to the reaction kettle may be performed continuously without any pause, or there may be one or more pause. Independently, in some embodiments, at least one high-reactivity monomer is added using a rate of addition that increases and then decreases. If two or more high-reactivity monomers are used, the rate of addition of each may be determined independently of the rate of addition of any other high-reactivity monomer. In some embodiments, two or more high-reactivity monomers are mixed together, and the mixture is added to the reaction vessel.

In some embodiments, the method of the present invention involves forming a copolymer using one or more free-radical polymerization reaction. Among such embodiments, some involve the use of one or more initiator. An initiator is a molecule or mixture of molecules that, under certain conditions, produces at least one free radical capable of initiating a free-radical polymerization reaction. Some initiators ("thermal initiators") produce such radicals by decomposing when exposed to sufficiently high temperature. Some initiators produce such radicals when certain molecules are mixed together to cause a chemical reaction that results in at least one free radical (such as, for example, some combinations known as "redox" initiators, which contain at least one oxidizing agent and at least one reducing agent). Some initiators ("photoinitiators") produce radicals when exposed to radiation, such as, for example, ultraviolet light or electron beam. Also contemplated are initiators that can be exposed to high temperature simultaneously with the presence of at least one reducing agent, and such initiators may produce free radicals by thermal decomposition, by oxidation-reduction reaction, or by a combination thereof.

Examples of suitable photoinitiators are benzophenone, acetophenone, benzoin ether, benzyl dialkyl ketones and derivatives thereof.

Of the suitable thermal initiators, some have a decomposition temperature of 20° C. or higher; or 50° C. or higher. Independently, some have decomposition temperature of 180° C. or lower; or 90° C. or lower. Examples of suitable thermal initiators are inorganic peroxo compounds, such as peroxodisulfates (ammonium and sodium peroxodisulfate), peroxosulfates, percarbonates and hydrogen peroxide; organic peroxo compounds, such as diacetyl peroxide, di-tert-butyl peroxide, diamyl peroxide, dioctanoyl peroxide, didecanoyl peroxide, dilauroyl peroxide, dibenzoyl peroxide, bis(o-tolyl) peroxide, succinyl peroxide, tert-butyl peracetate, tert-butyl permaleate, tert-butyl perisobutyrate, tert-butyl perpivalate, tert-butyl peroctoate, tert-butyl pemeodecanoate, tert-butyl perbenzoate, tert-butyl peroxide, tert-butyl hydroperoxide, cumene hydroperoxide, tert-butyl peroxy-2-ethylhexanoate and diisopropyl peroxydicarbamate; azo compounds, such as 2,2'- azobisisobutyronitrile, 2,2'-azobis (2-methylbutyronitrile), 2,2'-Azobis (2-methylpropionamidine)dihydrochloride, and azobis(2-amidopropane) dihydrochloride.

In some embodiments, thermal initiators can optionally be used in combination with reducing compounds. Examples of such reducing compounds are phosphorus-containing compounds, such as phosphorus acid, hypophosphites and phosphinates; sulfur-containing compounds, such as sodium hydrogen sulfite, sodium sulfite, sodium metabisulfite, and sodium formaldehyde sulfoxylate; and hydrazine. It is considered that these reducing compounds, in some cases, also function as chain regulators.

One group of suitable initiators is the group of persulfates, including, for example, sodium persulfate. In some embodiments one or more persulfate is used in the presence of one or more reducing agent, including, for example, metal ions (such as, for example, ferrous ion), sulfur-containing ions (such as, for example, $S2O3(=)$, $HSO3(-)$, $SO3(=)$, $S2O5(=)$, and mixtures thereof), and mixtures thereof.

When initiator is used, the amount of all initiator used, as a weight percentage based on the total weight of all monomers used, is 0.01% or more; or 0.03% or more; or 0.1% or more; or 0.3% or more. Independently, when initiator is used, the ratio of the weight of all initiator used to the total weight of all monomers used is 5% or less; or 3% or less; or 1% or less.

When initiator is used, it may be added in any fashion, at any time during the process. For example, some or all of the initiator may be added to the reaction vessel at the same time that one or more of the monomers is being added to the reaction vessel. In some embodiments, the initiator is added with a constant rate of addition. In other embodiments, the initiator is added with an increasing rate of addition, for example in two or more steps, where each step uses a higher rate of addition than the previous step. In some embodiments, the rate of addition of initiator increases and then decreases.

The practice of the present invention also involves the use of a chain regulator. A chain regulator is a compound that acts to limit the length of a growing polymer chain. Some suitable chain regulators are, for example, sulfur compounds, such as mercaptoethanol, 2-ethylhexyl thioglycolate, thioglycolic acid, and dodecyl mercaptan. Other suitable chain regulators are the reducing compounds mentioned herein above. In some embodiments, the chain regulator includes sodium metabisulfite. In some embodiments, the amount of chain regulator, as a percentage by weight based on the total weight of all monomers used, is 0.5% or more; or 1% or more; or 2% or more; or 4% or more. Independently, in some embodiments, the amount of chain regulator, as a percentage by weight based on the total weight of all monomers used, is 12% or less; or 8% or less; or 6% or less. In some embodiments, amounts of initiator larger that the amount needed to initiate polymerization can act as chain regulator.

Other suitable chain regulators are, for example, the OH-containing compounds described hereinabove as suitable for use in a mixture with water to form a solvent. It is contemplated that, in some embodiments, the chain regulator is a component of the solvent and thus the chain regulator may be present in amounts larger than 12% by weight based on the total weight of all monomers used.

Chain regulator may be added to the reaction vessel in any fashion. In some embodiments, the chain regulator is added to the reaction vessel at a constant rate of addition. In some embodiments, the chain regulator is added to the reaction vessel at a rate of addition that increases or decreases or a combination thereof.

For each ingredient that is added to the reaction vessel, that ingredient may be added in pure form. Alternatively, an ingredient that is added to the reaction vessel may be added in the form of a solution in a solvent, in the form of a mixture with one or more other ingredient, or as a combination thereof (i.e., as a mixture with one or more other ingredient, where that mixture is dissolved in a solvent). The form in which any one ingredient is added to the reaction vessel may be chosen independently of the form in which any other ingredient is added to the reaction vessel.

The various ingredients may be added to the reaction vessel in any order, at any rate, as long as the conditions described herein above for the definition of the present invention are met.

The duration of the addition of low-reactivity monomer is the time elapsed from the time when the first low-reactivity monomer is added to the reaction vessel (i.e., the time when the first amount of any low-reactivity monomer is added to the reaction vessel) until the time when the last low-reactivity monomer is added to the reaction vessel (i.e., the time when the last amount of any low-reactivity monomer is added to the reaction vessel).

The duration of the addition of high-reactivity monomer is the time elapsed from the time when the first high-reactivity monomer is added to the reaction vessel until the time when the last high-reactivity monomer is added to the reaction vessel. High-reactivity monomer may be added continuously or with pauses; with constant rate of addition, or with variable rate of addition, as described herein above. In some embodiments, the ratio of the duration of addition of high-reactivity monomer to the duration of addition of low-reactivity monomer is 1.0 or greater; or 1.05 or greater; or 1.1 or greater; or 1.15 or greater. Independently in some embodiments, that ratio is 4 or lower; or 2 or lower. Independently, in some embodiments, the first low-reactivity monomer is added at the same time as the first high-reactivity monomer.

Some embodiments of the present invention have all of the following features: the addition of high-reactivity monomer to the reaction vessel begins at the same time that the addition of low-reactivity monomer to the reaction vessel begins; the rate of addition of high-reactivity monomer increases, optionally in a series of steps of increasing rate of addition, until the addition of low-reactivity monomer is completed; and then the addition of high-reactivity monomer continues with decreasing rate of addition, optionally in a series of steps of decreasing rate of addition, until the addition of high-reactivity monomer is completed.

The duration of the addition of initiator is the time elapsed from the time when the first initiator is added to the reaction vessel until the time when the last initiator is added to the reaction vessel. Initiator may be added continuously or with pauses; with constant rate of addition, or with variable rate of addition, as described herein above. In some embodiments, the ratio of the duration of addition of initiator to the duration of addition of high-reactivity monomer is 1.0 or greater; or 1.02 or greater. Independently in some embodiments, that ratio is 2 or lower; or 1.5 or lower; or 1.2 or lower. Independently, in some embodiments, the first initiator is added at the same time as the first low-reactivity monomer.

In some embodiments, chain regulator is added to the reaction vessel prior to the addition of any monomer. Independently, in some embodiments chain regulator is added to the reaction vessel after the first low-reactivity monomer is added to the reaction vessel, or at the same time as the first low-reactivity monomer is added to the reaction vessel, or in a combination thereof.

In some embodiments, a first portion of chain regulator is added to the reaction vessel before the addition of any monomer, and a second portion of chain regulator is added to the reaction vessel after the first low-reactivity monomer is added to the reaction vessel, or at the same time as the first low-reactivity monomer is added to the reaction vessel, or in a combination thereof. Among such embodiments, the duration of the addition of the second portion of chain regulator is the time elapsed from the time when the first chain regulator is added to the reaction vessel after the addition of the first low-reactivity monomer until the time when the last chain regulator is added to the reaction vessel. Chain regulator in the second portion may be added continuously or with pauses; with constant rate of addition, or with variable rate of addition, as described herein above. In some embodiments, the ratio of the duration of addition of the second portion of chain regulator to the duration of addition of low-reactivity monomer is 0.8 or greater; or 0.9 or greater; or 0.99 or greater. Independently in some embodiments, that ratio is 2 or lower; or 1.2 or lower; or 1.05 or lower; or 1.01 or lower. Independently, in some embodiments, the addition of the second portion of the chain regulator begins at the same time that the first low-reactivity monomer low-reactivity is added to the reaction vessel.

In some of the embodiments in which the chain regulator is added to the reaction vessel in two portions, as defined herein above, the ratio of the weight of chain regulator in the first portion to the weight of chain regulator in the second portion is 0.005 or higher; or 0.01 or higher; or 0.02 or higher; or 0.04 or higher. Independently, in some of such embodiments, that ratio is 1 or lower; or 0.5 or lower; or 0.2 or lower; or 0.1 or lower.

It is to be understood that for purposes of the present specification and claims that the range and ratio limits recited herein can be combined. As a further, independent, example, if a particular parameter is disclosed to have suitable minima of 1, 2, and 3, and if that parameter is disclosed to have suitable maxima of 9 and 10, then all the following ranges are contemplated: 1 to 9, 1 to 10, 2 to 9, 2 to 10, 3 to 9, and 3 to 10.

EXAMPLES

Example 1

A one liter resin kettle with overhead stirrer, N2 inlet, condenser, thermocouple, heating mantle, and inlets for the addition of monomers, chain regulator and initiator, and provision for external cooling was set up in a hood. 100 grams of deionized water and 3.96 grams of a 0.15% iron sulfate solution was added to the kettle and heated to 88° C. A kettle additive was prepared using 0.5 grams of sodium metabisulfite and 5 grams of deionized water. Monomer Cofeed #1 was prepared using 168 grams of 65 wt % solution of diallyldimethylammoinium chloride. Monomer Cofeed #2 was prepared using 46.6 grams of glacial acrylic acid and 90.7 grams of a 50% solution of acrylamide. An initiator solution of 1.4 grams of sodium persulfate and 30 grams of deionized water was prepared. A chain regulator solution was prepared using 11 grams of sodium metabisulfite and 35 grams if deionized water. When the temperature reached 88° C., the kettle additive was charged, and then all cofeeds began. Rates for the cofeeds are as follows:

Monomer Cofeed #1
   3.73 grams pre minute for 30 minutes
   0.93 grams pre minute to 60 minutes
Monomer Cofeed #2
   0.78 grams per minute for 22.5 minutes
   1.18 grams per minute for 22.5 minutes
   1.57 grams per minute for 22.5 minutes
   1.96 grams per minute for 22.5 minutes
   1.22 grams per minute for 7 minutes
   0.61 grams per minute for 8 minutes
Initiator Cofeed: 0.285 grams per minute for 110 minutes
Chain regulator: 0.511 grams per minute for 90 minutes.

At the completion of the feeds, 10 grams of rinses were added and the reaction was held for 15 minutes at 88° C. During the hold period the chaser solutions were prepared. Chase #1, a shot chase of 2 grams of glacial acrylic acid and 4 grams of deionized water was prepared. Chase solution #2, 2.7 grams of 70% tert-butyl hydroperoxide and 10 grams of deionized water was prepared. Chase solution #3, 0.96 grams of Bruggolite™ FF6 (disodium salts of 2-Hydroxy-2-sulfinatoacetic and 2Hydroxy-2-sufonatocetic acid, from Bruggeman Chemical) and 10 grams of deionized water was prepared. Chaser solution #4, 1 gram of glacial acrylic acid and 2 grams of deionized water was prepared. Chaser solution #5, 1.42 grams of 2,2'-Azobis(2-methylpropionamidine)dihydrochloride and 10 grams of deionized water was prepared. At the completion of the hold, Chase #1 was charged to the kettle and Chasers #2 and #3 were added simultaneously over minutes, while cooling the kettle to 78° C. The reaction was then held for 20 minutes. The Chasers #4 and #5 were added to the kettle as shots and the reaction was held for an additional 15 minutes. Then the contents were then cooled and packaged.

Example 2

Example #1 was repeated as above with the feed rate changes as follows.
Monomer Cofeed #1
   2.80 grams per minute for 30 minutes
   1.87 grams per minute to 30 minutes
   0.93 grams per minute for 30 minutes
Monomer Cofeed #2
   0.78 grams per minute for 22.5 minutes
   1.18 grams per minute for 22.5 minutes
   1.57 grams per minute for 22.5 minutes
   1.96 grams per minute for 22.5 minutes
   1.22 grams per minute for 7 minutes
   0.61 grams per minute for 8 minutes
Initiator Cofeed: 0.285 grams per minute for 110 minutes
Chain regulator: 0.511 grams per minute for 90 minutes.

Example 3

Example #2 was repeated as above, with the reaction temperature allowed to increase after 60 minutes to a maximum of 95° C.

Example 4

Example #1 was repeated as above, with kettle charges added at 92° C., the reaction temperature of 88° C. and with feed rates times and changes as follows.
Monomer Cofeed #1
   3.60 grams per minute for 30 minutes
   0.60 grams per minute to 75 minutes
Monomer Cofeed #2
   0.67 grams per minute for 26.25 minutes
   1.01 grams per minute for 26.25 minutes
   1.34 grams per minute for 26.25 minutes
   1.68 grams per minute for 26.25 minutes
   1.22 grams per minute for 7 minutes
   0.61 grams per minute for 8 minutes
Initiator Cofeed
   0.245 grams per minute for 105 minutes
   0.285 grams per minute for 18 minutes
Chain regulator: 0.438 grams per minute for 105 minutes.

Example 5

Example #1 was repeated as above, with kettle charges added at 92° C., the reaction temperature of 88° C. and with feed rates times and changes as follows.
Monomer Cofeed #1
   4.20 grams per minute for 30 minutes
   0.70 grams per minute to 60 minutes
Monomer Cofeed #2
   0.78 grams per minute for 22.5 minutes
   1.18 grams per minute for 22.5 minutes
   1.57 grams per minute for 22.5 minutes
   1.96 grams per minute for 22.5 minutes
   1.22 grams per minute for 7 minutes
   0.61 grams per minute for 8 minutes
Initiator Cofeed: 0.285 grams per minute for 110 minutes
Chain regulator: 0.511 grams per minute for 90 minutes.

Example 6

Example #1 was repeated as above, with kettle charges added at 92° C., the reaction temperature of 88° C. and with feed rates times and changes as follows.
Monomer Cofeed #1
   4.58 grams per minute for 30 minutes
   0.51 grams per minute to 60 minutes
Monomer Cofeed #2
   0.78 grams per minute for 22.5 minutes
   1.18 grams per minute for 22.5 minutes
   1.57 grams per minute for 22.5 minutes
   1.96 grams per minute for 22.5 minutes
   1.22 grams per minute for 7 minutes
   0.61 grams per minute for 8 minutes
Initiator Cofeed: 0.285 grams per minute for 110 minutes
Chain regulator: 0.511 grams per minute for 90 minutes.

Comparative Example C7

Example #1 was repeated with the following feed rates and time
Monomer Cofeed #1: 1.86 grams per minute for 90 minutes
Monomer Cofeed #2: 1.30 grams per minute for 105 minutes
Initiator Cofeed: 0.285 grams per minute for 110 minutes
Chain regulator: 0.511 grams per minute for 90 minutes Comparative Example C8

Example #1 was repeated with the following feed rates and time
Monomer Cofeed #1: 1.86 grams per minute for 90 minutes
Monomer Cofeed #2: 1.05 grams per minute for 130 minutes
Initiator Cofeed: 0.232 grams per minute for 135 minutes
Chain regulator: 0.511 grams per minute for 90 minutes

Comparative Example C9

Example #1 was repeated with the following feed rates and time
Monomer Cofeed #1: 1.86 grams per minute for 90 minutes
Monomer Cofeed #2: 0.242 grams per minute for 10 minutes
    0.462 grams per minute for 5 minutes
    0.641 grams per minute for 5 minutes
    0.788 grams per minute for 5 minutes
    0.914 grams per minute for 5 minutes
    1.029 grams per minute for 5 minutes
    1.113 grams per minute for 5 minutes
    1.197 grams per minute for 5 minutes
    1.260 grams per minute for 5 minutes
    1.313 grams per minute for 10 minutes
    1.407 grams per minute for 10 minutes
    1.470 grams per minute for 10 minutes
    1.512 grams pre minute for 10 minutes
    1.544 grams per minute for 5 minutes
    1.302 grams per minute for 5 minutes
    1.103 grams per minute for 5 minutes
    0.788 grams per minute for 5 minutes
    0.567 grams per minute for 10 minutes
    0.399 grams per minute for 10 minutes
    0.294 grams per minute for 10 minutes
Initiator Cofeed
    0.053 grams per minute for 10 minutes
    0.101 grams per minute for 5 minutes
    0.140 grams per minute for 5 minutes
    0.172 grams per minute for 5 minutes
    0.199 grams per minute for 5 minutes
    0.224 grams per minute for 5 minutes
    0.243 grams per minute for 5 minutes
    0.261 grams per minute for 5 minutes
    0.275 grams per minute for 5 minutes
    0.286 grams per minute for 10 minutes
    0.307 grams per minute for 10 minutes
    0.321 grams per minute for 10 minutes
    0.330 grams per minute for 10 minutes
    0.337 grams per minute for 5 minutes
    0.284 grams per minute for 5 minutes
    0.240 grams per minute for 5 minutes
    0.172 grams per minute for 5 minutes
    0.124 grams per minute for 10 minutes
    0.087 grams per minute for 10 minutes
    0.064 grams per minute for 20 minutes
Chain regulator: 0.511 grams per minute for 90 minutes

Comparative Example C10

Example #1 was repeated with the following feed rates and time
Monomer Cofeed #1: 1.86 grams per minute for 90 minutes
Monomer Cofeed #2:
    0.23 grams per minute for 10 minutes
    0.44 grams per minute for 5 minutes
    0.61 grams per minute for 5 minutes
    0.75 grams per minute for 5 minutes
    0.87 grams per minute for 5 minutes
    0.98 grams per minute for 5 minutes
    1.06 grams per minute for 5 minutes
    1.14 grams per minute for 5 minutes
    1.20 grams per minute for 5 minutes
    1.25 grams per minute for 10 minutes
    1.34 grams per minute for 10 minutes
    1.40 grams per minute for 10 minutes
    1.44 grams pre minute for 10 minutes
    1.47 grams per minute for 5 minutes
    1.24 grams per minute for 5 minutes
    1.05 grams per minute for 10 minutes
    0.75 grams per minute for 10 minutes
    0.54 grams per minute for 10 minutes
    0.38 grams per minute for 10 minutes
    0.28 grams per minute for 10 minutes
Initiator Cofeed
    0.053 grams per minute for 10 minutes
    0.101 grams per minute for 5 minutes
    0.140 grams per minute for 5 minutes
    0.172 grams per minute for 5 minutes
    0.199 grams per minute for 5 minutes
    0.224 grams per minute for 5 minutes
    0.243 grams per minute for 5 minutes
    0.261 grams per minute for 5 minutes
    0.275 grams per minute for 5 minutes
    0.286 grams per minute for 10 minutes
    0.307 grams per minute for 10 minutes
    0.321 grams per minute for 10 minutes
    0.330 grams per minute for 10 minutes
    0.337 grams per minute for 5 minutes
    0.284 grams per minute for 5 minutes
    0.240 grams per minute for 10 minutes
    0.172 grams per minute for 10 minutes
    0.124 grams per minute for 10 minutes
    0.087 grams per minute for 10 minutes
    0.064 grams pre minute for 30 minutes
Chain regulator: 0.511 grams per minute for 90 minutes.

Comparative Example C11

Example #1 was repeated with the following feed rates and time
Monomer Cofeed #1: 1.86 grams per minute for 90 minutes
Monomer Cofeed #2
    0.23 grams per minute for 10 minutes
    0.44 grams per minute for 5 minutes
    0.61 grams per minute for 5 minutes
    0.75 grams per minute for 5 minutes
    0.87 grams per minute for 5 minutes
    0.98 grams per minute for 5 minutes
    1.06 grams per minute for 5 minutes
    1.14 grams per minute for 5 minutes
    1.20 grams per minute for 5 minutes
    1.25 grams per minute for 10 minutes
    1.34 grams per minute for 10 minutes
    1.40 grams per minute for 10 minutes
    1.44 grams pre minute for 10 minutes
    1.47 grams per minute for 5 minutes
    1.24 grams per minute for 5 minutes
    1.05 grams per minute for 10 minutes
    0.75 grams per minute for 10 minutes
    0.54 grams per minute for 10 minutes
    0.38 grams per minute for 10 minutes
    0.28 grams per minute for 10 minutes
    0.20 grams per minute for 10 minutes
    0.14 grams per minute for 10 minutes
Initiator Cofeed
    0.053 grams per minute for 10 minutes
    0.101 grams per minute for 5 minutes
    0.140 grams per minute for 5 minutes
    0.172 grams per minute for 5 minutes
    0.199 grams per minute for 5 minutes 0.224 grams per minute for 5 minutes
0.243 grams per minute for 5 minutes
0.261 grams per minute for 5 minutes
0.275 grams per minute for 5 minutes
0.286 grams per minute for 10 minutes
0.307 grams per minute for 10 minutes
0.321 grams per minute for 10 minutes
0.330 grams per minute for 10 minutes
0.337 grams per minute for 5 minutes
0.284 grams per minute for 5 minutes
0.240 grams per minute for 5 minutes
0.172 grams per minute for 10 minutes
0.124 grams per minute for 10 minutes
0.087 grams per minute for 10 minutes
0.064 grams pre minute for 10 minutes
0.046 grams per minute for 10 minutes
0.032 grams per minute for 10 minutes
0.023 grams per minute for 5 minutes
Chain regulator: 0.511 grams per minute for 90 minutes.

Example 12

In each of the above examples, a sample was removed during the hold period immediately after the conclusion of all the cofeeds. Each sample was analyzed by proton NMR for the concentration of diallyldimethylammonium chloride (DADMAC) monomer. The amount is reported as a percentage by weight of monomer based on total weight of polymer solids. Also reported is the weight-average molecular weight (Mw), the number-average molecular weight (Mn), and the polydispersity (PD), measured on the copolymer by gel permeation chromatography. The results are as follows:

| Example | DADMAC (%) | Mw | PD | Mn |
|---|---|---|---|---|
| Comparative C9 | 11.5 | 12,600 | 13.3 | 946 |
| Comparative C10 | 14.2 | 11,700 | 11.9 | 987 |
| Comparative C11 | 10.2 | 11,700 | 12.4 | 943 |
| Comparative C7 | 14.7 | 7,100 | 5.86 | 1,210 |
| Comparative C8 | 16.9 | 48,800 | 37.2 | 1,310 |
| 1 | 6.2 | 6,230 | 5.44 | 1,150 |
| 2 | 9.4 | 6,290 | 6.65 | 945 |
| 3 | 8.1 | 6,300 | 6.10 | 1,030 |
| 4 | 5.3 | 5,990 | 5.89 | 1,020 |
| 5 | 3.7 | 5,510 | 4.47 | 1,230 |
| 6 | 4.3 | 4,710 | 4.49 | 1,050 |

The Examples of the present invention have lower residual DADMAC, lower Mw, and lower PD than the Comparative Examples.

We claim:

1. A process for producing a polymer comprising the steps of
    (a) adding at least one low-reactivity monomer to a reaction vessel with a decreasing rate of addition,
    (b) adding at least one high-reactivity monomer to said reaction vessel,
        (i) wherein less than 1% of all of said high-reactivity monomers, by weight of high reactivity monomers, based on the weight of all said high-reactivity monomers, is added to said reaction vessel before the beginning of said step (a), and
        (ii) wherein at least half of all of said high-reactivity monomers, by weight of high reactivity monomers, based on the weight of all of said high-reactivity monomers, is added to said reaction vessel before the completion of said step (a), and
    (c) adding at least one chain regulator to said reaction vessel prior to the completion of said step (a),
    wherein said steps (a), (b), and (c) are performed while conditions in said reaction vessel will cause polymerization of said low-reactivity monomer and said high-reactivity monomer.

2. The method of claim 1, wherein the duration of the addition of said high-reactivity monomer is longer than the duration of the addition of said low-reactivity monomer.

3. The method of claim 1, wherein the rate of addition of said high-reactivity monomer increases and then decreases.

4. The method of claim 1, wherein some or all of said chain regulator is added to said reaction vessel after the first said low-reactivity monomer is added to said reaction vessel.

5. The method of claim 1, wherein said conditions in said reaction vessel that will cause polymerization are established by a process that comprises adding initiator to said reaction vessel at the same time that said low-reactivity monomer is added to said reaction vessel.

6. The method of claim 1, wherein said low-reactivity monomer comprises at least one diallyldialkylammonium quaternary compound.

7. The method of claim 6, wherein said diallyldialkylammonium quaternary compound comprises diallyldimethylammonium chloride.

8. The method of claim 1, wherein said high-reactivity monomer comprises acrylic acid or methacrylic acid or a mixture thereof.

9. The method of claim 8, further comprising the step of adding acrylamide or methacrylamide or a mixture thereof to said reaction vessel.

* * * * *